Patented Oct. 5, 1954

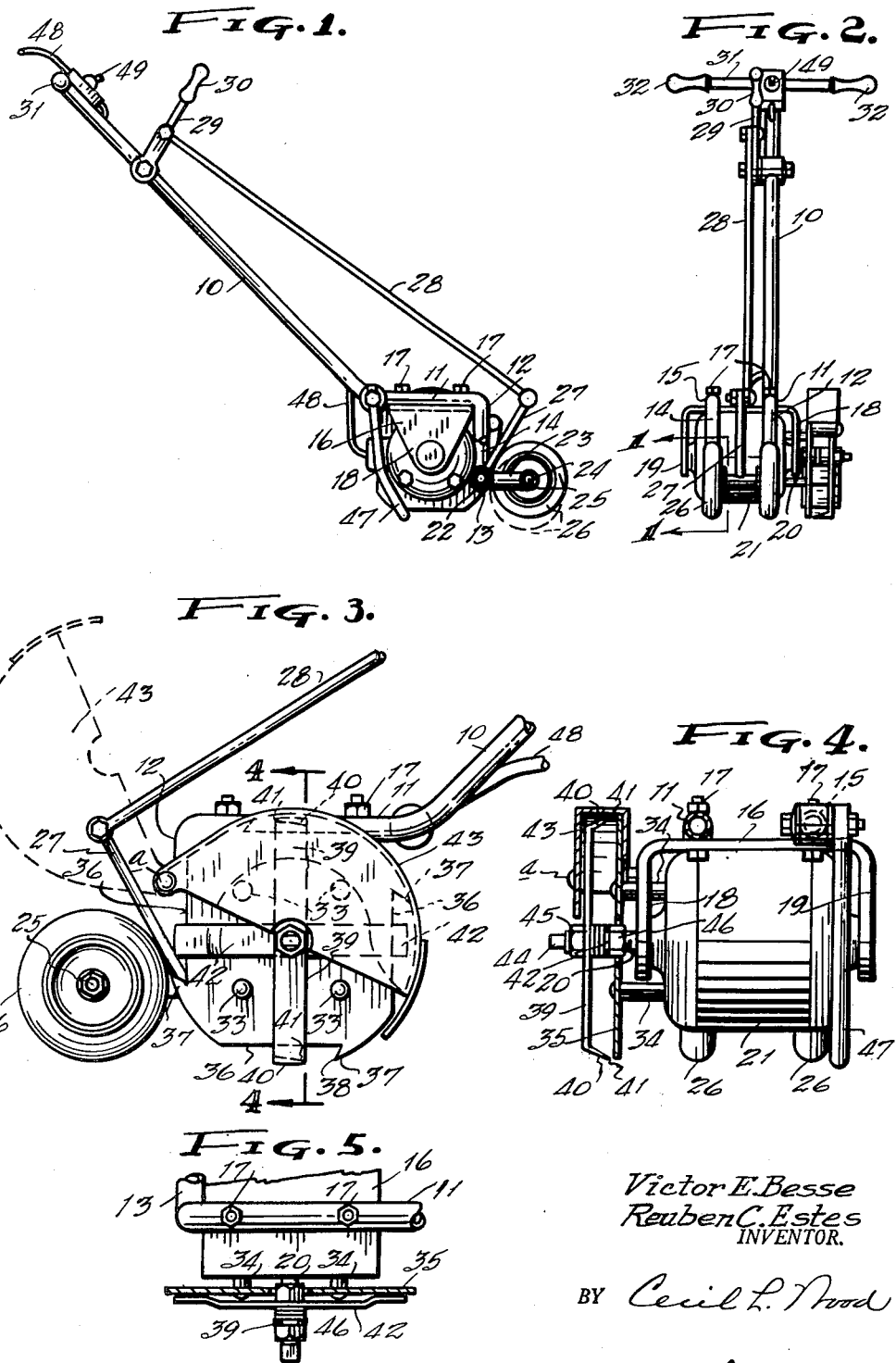

2,690,636

UNITED STATES PATENT OFFICE 2,690,636

LAWN EDGER AND TRIMMER

Victor E. Besse and Reuben C. Estes,
Fort Worth, Tex.

Application April 4, 1952, Serial No. 280,602

4 Claims. (Cl. 56—25.4)

This invention relates to grass edging mechanisms, and it has particular reference to devices for trimming lawns and grass plots along walks, curbs, buildings, and the like, and its principal object resides in the provision of an edging mechanism especially designed to perform a chopping action as it cuts, removing the grass growing over the edges of walks and curbs, and defining a space therealong, thus obviating the necessity for frequent trimming operations and insuring an attractive appearance.

An object of the invention is that of providing an edging device having a cantilever type of frame in which the motor is suspended, and having a pair of wheels providing a carriage for the assembly which is adjustable by a lever arrangement to raise or lower the frame, and thus the cutting members, with respect to the ground, so that the cutting elements can be set shallow or deep, as desired, or in accordance with the condition of the soil or the vegetation to be cut.

A still further object of the invention resides in the provision of a novel arrangement whereby the stationary plate is circular and has its periphery formed with segmental barbs so that as each becomes worn or dull, the plate can be detached from the frame and partially rotated to present a fresh cutting element to the ground, thereby enhancing the efficiency of the device with a minimum of effort and time.

Yet another object of the invention is that of providing a rotary doffing arm, operating in the motor shaft and in cooperating with the rotary cutting arm to engage and direct the grass fronds or runners, which extend over the edges of the walks and curbs, against the stationary plate in the path of the rotary cutting element to insure a complete severance of the vegetation.

Broadly, the invention contemplates the provision of a simple and inexpensive mechanism which is sturdy in construction and embodying a balanced arrangement of parts which insures easy maneuverability and efficiency in operation.

While the foregoing objects are paramount, other and lesser objects will become manifest as the description proceeds, taken in connection with the appended drawings wherein:

Figure 1 is a side elevational view of the invention, showing the wheel adjusting lever assembly, and the axle and linkage, on lines 1—1 of Figure 2.

Figure 2 is a front elevational view of the device showing the control handle and adjusting lever assembly.

Figure 3 is an enlarged side elevational view of the invention, illustrating the stationary cutting plate, rotary cutting arm and doffing arm, the handle and adjusting lever mechanism being cut away.

Figure 4 is a rear view of the motor and a vertical sectional view, on lines 4—4 of Figure 3, through the stationary cutting plate and showing the form of the rotary cutting arm and its relation to the stationary plate, and Figure 5 is a fragmentary plan view of the applicants' device with parts broken away and shown in section showing the relationship between stationary plate and the doffing arm.

Accordingly, the invention has a frame which is formed in one piece with the handle 10 and comprises a portion 11, which normally assumes a horizontal plane, a vertical portion 12 which extends downwardly, a right-angular portion 13, another vertical portion 14 which extends upwardly, spaced from and parallel to the portion 12, and a horizontal portion 15 which is in the same horizontal plane with the portion 11 and spaced therefrom, as shown in Figures 1 and 2.

A motor supporting bracket 16 is secured to the undersides of the portions 11 and 15 by bolts 17 and has depending flanges 18 and 19 at its sides through which the shaft 20 of an electric motor 21 is extended and by which the latter is supported, as illustrated in Figures 1, 2 and 4. The horizontal right-angular portion 13 of the frame affords a shaft for a sleeve 22 which has an integral right-angular arm 23 intermediate its ends which extends forwardly of the frame and has a transverse sleeve 24 thereon providing a journal for an axle 25 for a pair of wheels 26.

The sleeve 22 is rotatable on the member 13 so that the arm 23 can move in an arc to permit the axle 25 to be adjusted so that the wheels 26 can be raised or lowered, as indicated in dotted lines in Figure 1. A lever 27 is connected integrally to the sleeve 22 and extends upwardly therefrom at an angle and a rod 28 is pivotally attached to its upper end, the opposite end of the rod 28 being pivotally connected intermediate the ends of a lever 29 pivoted to the handle 11 and having a grip 30 thereon. Through this linking arrangement the frame can be raised or lowered with respect to the ground as the wheels 26 are adjusted as described. The handle 11 has a crossbar 31 having a grip 32 on each end, as apparent in Figure 2.

Attached to one side of the motor 21, by bolts 33 arranged through spacers 34, is a stationary cutter plate 35 which is generally circular in form and has an aperture centrally thereof through which the shaft 20 of the motor 21 extends, as shown in Figures 3, 4 and 5. The periphery of the plate 35 has segmental cut-out portions 36 to define barbs 37 which are angular and have their points 38 extending in the direction of travel of the invention, as illustrated in Figure 3.

This arrangement is provided so that by detaching the plate 35 it can be rotated one-quarter turn and reattached to its mounting to present a fresh segment to the ground as its predecessor becomes dull or worn.

On the outer end of the motor shaft 20 is attached a rotary arm 39 whose ends extend to the periphery of the plate 35 and have angular blades 40 whose operative edges 41 are sharpened to provide a chopping operation in cooperation with the barbs 37 of the plate 35, the latter being presented to the walk or curb, as the invention is propelled therealong, while the rotary arm 39 operates on the soil side of the device, and by reason of its angular blades, which preferably assume an obtuse angle of approximate 45 degrees, a V-type cut is performed.

In order to cut off the fronds or stems of grass, sometimes called runners, which extend over the concrete, a rotary doffing arm 42 is attached to the shaft 20 of the motor 21, transversely to the arm 39, and doffs the grass stems against the operative barb 37 so that the blades 40 can sever them. The doffer arm 42 is mounted relatively close to the plate 35, and also has sharpened edges which perform a shearing action in cooperation with the plate 35, as shown in Figure 5.

A guard 43 is hinged to the bracket 16 at $a$ and conformably shields the plate 35 and the rotary elements 39 and 42, as shown in Figures 3 and 4, and is capable of being raised to the position shown in dotted lines in Figure 3 when it is desirable to change the plate 35 to a different operative position or to remove the elements 39 and 42. A wrench-hold 44 is provided for the end of the motor shaft 20 by which the same can be prevented from rotation while the nuts 45 and 46 are removed. A swinging leg 47 provides a support for the invention while at rest. An electrical conductor 48 and switch 49 are provided for the motor 21.

Manifestly, the structure herein shown and described is capable of certain changes and modifications from time to time, by persons skilled in the art, without departing from the spirit of the invention or the scope of the appended claims.

What is claimed is:

1. In a grass edging device having a main frame and a motor suspended in said main frame, the combination comprising, a circular stationary cutting head secured to said frame in a vertical plane about the shaft of said motor and having an angular barb on its lower edge, a rotary cutting element on the shaft of said motor and spaced outwardly from said stationary cutting head, an angular sharpened blade on each end of said rotary element extending inwardly toward said stationary cutting head and cooperating with the latter, a doffing arm on said motor shaft cooperating with said rotary element to direct the vegetation into the path of the latter, supporting wheels mounted forwardly of said frame and having a pivotal linkage therewith, a handle on said frame for guiding the device, and lever means on said handle for raising and lowering said cutting elements.

2. In a grass edging machine having a frame and a motor suspended in said frame, and a pair of wheels forwardly of said frame, the combination comprising, a substantially circular stationary cutting plate secured to said frame transverse to the axis of said motor and in a vertical plane, the said cutting plate having at least one angular projection on its lower edge, a rotary arm on the shaft of said motor and rotating in a plane spaced from and parallel to said stationary plate, a sharpened blade forming a part of each end of said rotary arm and extending at an obtuse angle therefrom toward said stationary plate and cooperating with said angular projection thereon, a cutting and doffing arm on the shaft of the said motor and transverse to said rotary arm and cooperating therewith, a handle for said frame, and lever means on said handle for adjusting the said frame with respect to the ground.

3. In a grass edging device having a wheeled frame and a motor having a horizontal shaft suspended in said frame; the combination comprising, a stationary circular cutting plate secured to said frame in a vertical plane and surrounding the shaft of said motor, at least one angular barb formed on the lower edge of said plate, a rotary arm on said shaft spaced from and rotating in a plane parallel to the surface of said cutting plate and cooperating with said angular barb, the ends of said rotary arm being extended inwardly and at an angle therefrom and having sharpened edges, a doffing element on said shaft arranged transversely of said rotary arm, a handle for said frame, and a lever on said handle for adjusting the said frame with respect to the ground.

4. In a grass cutting device having a frame and a motor suspended therein having a shaft, and a pair of wheels having a shaft pivotally linked to said frame, the combination comprising, a stationary cutting plate secured in a vertical plane to one side of said frame and surrounding the shaft of said motor and formed with a peripheral barb on its lower edge, a rotary arm on said motor shaft rotating in a plane parallel to and spaced from that of said stationary plate, each end of said rotary arm being turned at an angle from the longitudinal plane of said arm toward said stationary plate, each of said ends having a sharpened edge so that upon rotation of said arm said edges will cooperate with the barb on said plate, a doffing blade on said shaft transversely of said rotary arm, a handle for said frame, and lever means on said handle for adjusting said wheels with respect to said frame.

References Cited in the file of this patent

UNITED STATES PATENTS

| Number | Name | Date |
| --- | --- | --- |
| D. 163,486 | Sanford | May 29, 1951 |
| 518,250 | Holland-Letz | Mar. 2, 1897 |
| 2,556,790 | Berdan | June 12, 1951 |
| 2,608,043 | Berdan | Aug. 26, 1952 |
| 2,612,741 | McKay | Oct. 7, 1952 |